United States Patent [19]

Pesto, Jr.

[11] Patent Number: 5,799,204
[45] Date of Patent: Aug. 25, 1998

[54] SYSTEM UTILIZING BIOS-COMPATIBLE HIGH PERFORMANCE VIDEO CONTROLLER BEING DEFAULT CONTROLLER AT BOOT-UP AND CAPABLE OF SWITCHING TO ANOTHER GRAPHICS CONTROLLER AFTER BOOT-UP

[75] Inventor: William Steve Pesto, Jr., Madison, Ala.

[73] Assignee: Intergraph Corporation, Huntsville, Ala.

[21] Appl. No.: 432,106

[22] Filed: May 1, 1995

[51] Int. Cl.[6] .................... G06F 15/46; G09G 1/00
[52] U.S. Cl. .................... 395/830; 395/834; 395/823; 395/162
[58] Field of Search .................... 395/162, 163, 395/823, 830, 834

[56] References Cited

U.S. PATENT DOCUMENTS

| 4,400,735 | 8/1983 | Strammello, Jr. | 358/181 |
|---|---|---|---|
| 4,679,166 | 7/1987 | Berger et al. | 364/900 |
| 4,803,464 | 2/1989 | Holmes et al. | 340/732 |
| 4,862,156 | 8/1989 | Westberg et al. | 340/747 |
| 5,072,411 | 12/1991 | Yamaki | 395/162 |
| 5,113,497 | 5/1992 | Dewa | 395/275 |
| 5,159,683 | 10/1992 | Lvovsky et al. | 395/500 |
| 5,208,745 | 5/1993 | Quentin et al. | 364/188 |
| 5,222,212 | 6/1993 | Johary et al. | 395/162 |
| 5,303,027 | 4/1994 | Kuderer et al. | 356/328 |
| 5,404,445 | 4/1995 | Matsumoto | 395/162 |
| 5,594,874 | 1/1997 | Narayanan et al. | 395/284 |

Primary Examiner—Thomas C. Lee
Assistant Examiner—Rehana Perveen
Attorney, Agent, or Firm—Bromberg & Sunstein LLP

[57] ABSTRACT

A high-performance video controller is provided for a microprocessor-based computer having a bus, which has a plurality of slots for receiving slot connectors for peripheral-type devices, wherein (i) the bus is of the type imposing a single-device-per-slot limitation and (ii) the computer has a BIOS requiring on boot-up of the computer the presence of a standard video controller (e.g. VGA). The high-preformance controller includes (a) a connector arrangement having at least one slot connector, and (b) a standard-video-controller subsystem coupled to the connector arrangement and having a video output, and (c) an advanced graphics subsystem that is also coupled to the connector arrangement and that also has a video output. The connector arrangement may have a plurality of slot connectors so that the standard-video-controller subsystem is connected to a separate slot from the advanced graphics subsystem, which also has its own slot. The slot connectors and the circuit boards holding the components of the two subsystems may be mechanically rigidly linked to one another, spaced apart the same amount as the bus's slots, so that the two connectors can be plugged into parallel slots together. Some of the components of the advanced graphics subsystem may be placed on each of two circuit boards, while the standard-video-controller subsystem's component or components are preferably placed on just one of the two boards. The invention may include a switch configured to provide, at the system video output, the video output of the standard-video-controller subsystem during boot-up and otherwise the video output of the advanced graphics subsystem.

18 Claims, 12 Drawing Sheets

FET SWITCHES

RELAY

ANALOG MUX

"WIRE OR" WITH CURRENT MODE DACS FOR SELECT

GLI HOST ADAPTER

GLI EXPANSION ADAPTER

VIDEO GRAPHICS ADAPTER

FRAME BUFFER BOARD (FRONT)

FRAME BUFFER BOARD (BACK)

SYSTEM UTILIZING BIOS-COMPATIBLE HIGH PERFORMANCE VIDEO CONTROLLER BEING DEFAULT CONTROLLER AT BOOT-UP AND CAPABLE OF SWITCHING TO ANOTHER GRAPHICS CONTROLLER AFTER BOOT-UP

DESCRIPTION

Disclosure generally pertinent to the context of the present invention is contained in the following related applications, all filed on the same day as the application herewith, and having the same assignee as the present application: "Vertex List Management System," Ser. No. 08/432,314 (now pending), for an invention of Jeffrey J. Holt; "Video Stream Data Mixing for 3D Graphics Systems," Ser. No. 08/431,821 (now pending), for an invention of David Young and Jeffrey J. Holt; "Graphics Processing with Efficient Vector Drawing," Ser. No. 08/825,259 (now pending) for an invention of Jeffrey J. Holt; "FIFO Logical Addresses for Control and Error Recovery," Ser. No. 08/432,313 (now pending), for an invention of Jeffrey J. Holt and David W. Young; "Direct Access to Slave Processor by Unprotected Application Using Context Saving and Restoring," Ser. No. 08/431,820 (now pending), for an invention of David W. Young; and "System and Method for Controlling A Slave Processor," Ser. No. 08/432,272 (now pending), for an invention of David W. Young and Jeffrey J. Holt. These related applications are hereby incorporated herein by reference.

TECHNICAL FIELD

The present invention relates to apparatus and methods for video controllers, and more particularly to apparatus and methods for high-performance video controllers in microprocessor-based computers.

BACKGROUND ART

Presently, many personal computers and other workstation-type computers use a PCI (Peripheral Component Interchange) local bus or a similar bus. Buses provide the communication path between the computer's central processing unit (CPU) and other components of the computer, such as memory and interfaces to peripheral devices, e.g. monitors, printers, disk drives, modems, etc. Buses, including the PCI bus, typically have a plurality of slots for receiving a slot connector associated with a peripheral device. In particular, a monitor typically is connected to the bus by a video card with a slot connector.

Many personal computers use a standard basic input-output system (BIOS) that requires the presence of a standard video controller (typically, a video graphics adapter—VGA) on the bus. Without the standard video controller, a computer with standard BIOS is unable to boot up. The standard video controller is usually found on the video card that links the monitor to the PCI bus.

Systems using advanced graphics controllers, in particular those controllers capable of processing information about three-dimensional works—which may be viewed from various points or rotated—so that the work may be properly displayed on the monitor, have generally been run on computers specifically designed for processing graphics. Because of the requirement of standard BIOS that a standard video controller be present on the bus, users have been unable to use the capabilities of advanced graphics controllers on a standard personal computer without using a non-standard BIOS that does not require the presence of a standard video controller. There can be, however, disadvantages to using non-standard BIOS; generally, the use of a non-standard BIOS increases the likelihood that other peripherals and other software will not be compatible with the computer.

In addition to these concerns, personal computers have limitations on the physical space inside the computer's housing. In practice, buses are limited in the number of slots they can have for receiving various slot connectors. In addition, an advanced graphics controller usually has many processing and memory components, all of which may not easily fit on a single circuit board attached to a single bus slot. Other physical limitations are imposed by the use of a PCI or similar bus. As set forth on page 117 of the *PCI Local Bus Specification*, revision 2.0, published Apr. 30, 1993 by the PCI Special Interest Group, M/S HF3-15A, 5200 N.E. Elam Young Parkway, Hillsboro, Oreg. 97124-6497, the PCI bus has a single-device-per-slot limitation. In addition, as set forth on page 115 of this *PCI Local Bus Specification*, the maximum power allowed for any board attached to a slot in the PCI bus is 25 watts. The *PCI Local Bus Specification*, Revision 2.0, is incorporated herein by reference.

SUMMARY OF THE INVENTION

The invention is a high-performance video controller for a microprocessor-based computer having a bus, which has a plurality of slots for receiving slot connectors for peripheral-type devices (such as video cards, disk drive controllers and modems), wherein (i) the bus is of the type imposing a single-device-per-slot limitation and (ii) the computer has a BIOS requiring on boot-up of the computer the presence of a standard video controller (e.g. VGA). The invention includes (a) a connector arrangement having at least one slot connector, and (b) a standard-video-controller subsystem coupled to the connector arrangement and having a video output, and (c) a second-video-controller subsystem that is also coupled to the connector arrangement and that also has a video output. The standard-video-controller subsystem includes the electronic components—or component—one would normally find in a standard video controller. The second-video-controller subsystem preferably includes the electronic components for a video controller that is more advanced than the standard video controller (and which, presumably, is not recognized by the standard BIOS). Preferably, the second-video-controller subsystem includes all the electronic components necessary for an advanced graphics controller.

In one preferred embodiment, the connector arrangement has a plurality of slot connectors so that the standard-video-controller subsystem is connected to a separate slot from the second-video-controller subsystem, which also has its own slot. In another preferred embodiment, only a single slot connector is used, and the two subsystems share the same slot through a switching arrangement.

In the embodiment having a plurality of slot connectors, the slot connectors are preferably mechanically rigidly linked to one another, spaced apart the same amount as the bus's slots, so that the two connectors can be plugged into parallel slots together. It is also preferred to use a plurality of circuit boards that are also mechanically rigidly linked to one another, such that each slot connector is associated with one of the circuit boards. Such a connection between the circuit boards allows a two-circuit-board configuration to be handled and installed efficiently and conveniently.

If two circuit boards are used—regardless of whether the boards are rigidly linked—some of the plurality of components of the second-video-controller subsystem may be placed on each of the two boards, while the standard-video-controller subsystem's component or components may be placed on just one of the boards. Data may be transferred between the components of the second-video-controller subsystem on the different boards by means of a ribbon cable or other wiring capable of providing a secondary bus amongst the components of the second-video-controller subsystem.

In a preferred embodiment, the invention includes a switch configured to provide, at the system video output, the video output of the standard-video-controller subsystem during boot-up and otherwise the video output of the second-video-controller subsystem. In a preferred version, the switch arrangement is disposed between (i) the video outputs of each of the standard-video-controller subsystem and the second-video-controller subsystem and (ii) the system video output. A bridging switch arrangement may be also be disposed between (i) each of the standard-video-controller subsystem and the second-video-controller subsystem and (ii) the connector arrangement, preferably along with a switch arrangement disposed between (i) the video outputs of each of the standard-video-controller subsystem and the second-video controller subsystem and (ii) the system video output.

DETAILED DESCRIPTION OF SPECIFIC EMBODIMENTS

Advanced Graphics Processing System

Figure 1:
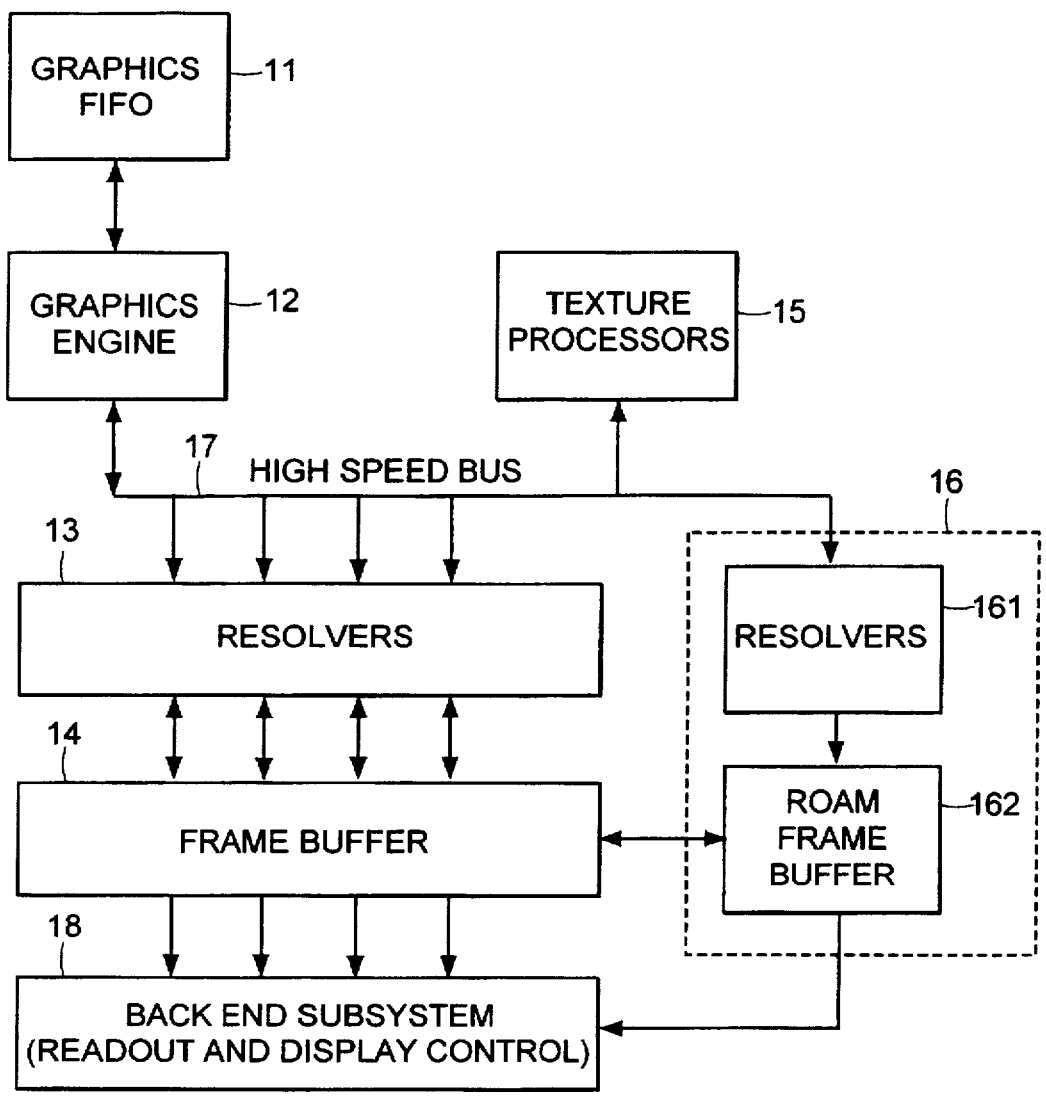
FIG. 1 is a block diagram of showing modules of a video graphics processor-controller may be used in the present invention.

A preferred embodiment of the present invention has been implemented using, as the second-video-controller subsystem, a graphics controller-processor having the general structure shown in FIG. 1. This embodiment is suitable for use with computers, such as those utilizing the Intel family of 80×86 processors (including the Pentium), running an operating system such as Microsoft Windows NT, designed to communicate over a PCI Local Bus, pursuant to the *PCI Local Bus Specification*, revision 2.0 (Apr. 30, 1993), which has been incorporated hereinabove by reference. However, the embodiment may also be configured, for example, to operate in an X-windows Unix environment, and on other buses, such as VL (VESA Local Bus). There are different implementations of this embodiment's architecture that may have reduced functionality and/or plane sets.

The architecture of this graphics controller-processor can be broken down into six basic subsystems. Of these two are optional. The basic system has a graphics engine 12 that accepts requests via a FIFO buffer 11. These requests are broken down by the graphics engine 12 into pixel requests, which are written over a wide high-speed (secondary) bus 17 to a set of resolvers 13, which in turn control reading and writing of the frame buffer 14. The back end subsystem 18 reads the frame buffer and displays it on the screen of a suitable monitor.

The texture processors 15 and roam processor 16 are optional subsystems. The roam processor subsystem includes its own resolvers 161 and roam frame buffer 162.

Figure 2:
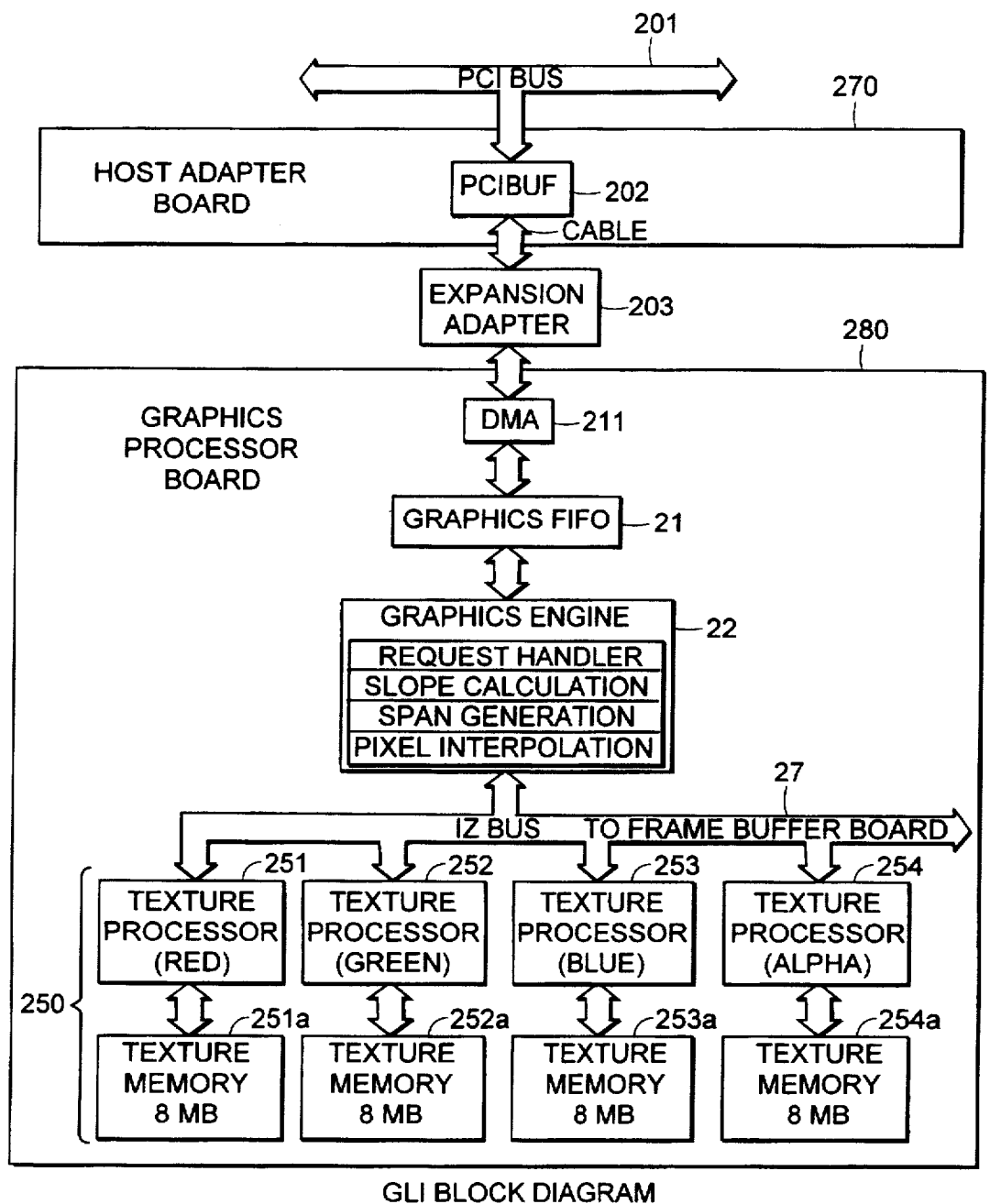
FIG. 2 is a block diagram of a graphics processor system that may be used in a preferred embodiment of the present invention.
Figure 3:
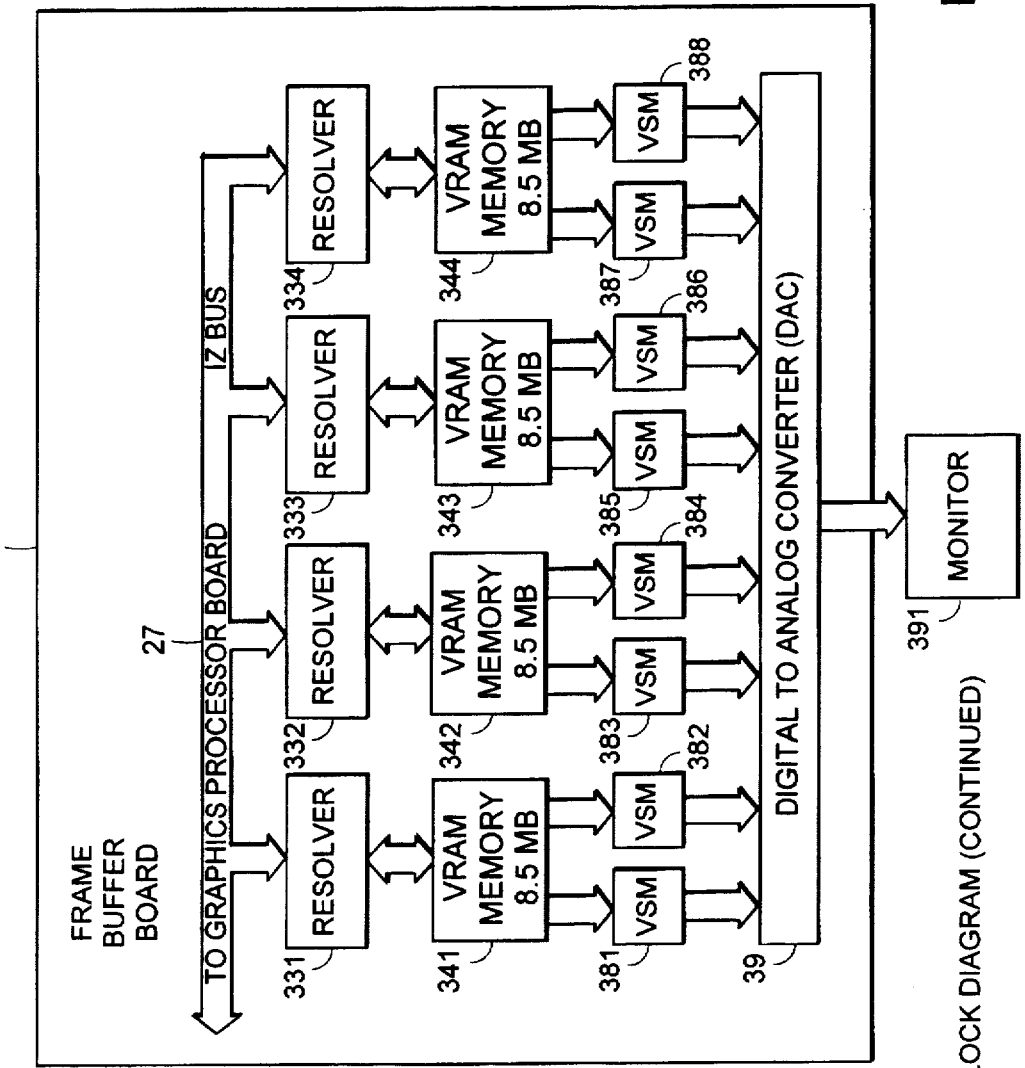
FIG. 3 is a block diagram of a frame buffer system that may be used with the graphics processor system shown in FIG. 2.

FIGS. 2 and 3 are more detailed block diagrams of an advanced graphics processor system and a frame buffer system in accordance with the embodiment of FIG. 1 and are referred to in the discussion below. (The components of this system are placed on circuit boards—more than one circuit board being necessary because of the large number of processing and memory components required. One arrangement is shown in FIGS. 7A–7E and discussed in greater detail below.) The rendering subsystem includes the PCI buffer 202, which is an ASIC (application specific integrated circuit), the DMA ASIC 211, graphics FIFO 21, and graphics engine ASIC 22. Rendering is the process of drawing triangles, lines, and line strings. The rendering subsystem also performs region fill operations, bit expands and blit operations. Software on the host processor performs the necessary 3D transform and lighting calculations. These calculations result in vertex data which consists of coordinate (X,Y,Z) and color information (R,G,B,A). The host computer typically sends the vertex data to a buffer in main memory.

The vertex data enters the rendering subsystem through the PCI bus interface in the PCI buffer ASIC 202. The PCI buffer 202 ASIC provides an internal FIFO to allow PCI bus burst transfers. It also provides an interface to the expansion cable.

The DMA ASIC 211 is a multichannel, Direct Memory Access (DMA) engine capable of burst transfer for lengths of up to 4MB. The system software uses the DMA ASIC to transfer vertex data from main memory of the host computer to the graphics FIFO 21.

Graphics Engine

The graphics engine ASIC 22 is the main graphics processor and the core of the rendering subsystem. It takes vertex data from the graphics FIFO 21 and produces rendered spans of pixel data. The graphics engine ASIC 22 sends the data to the frame buffer subsystem over a high speed pixel path called the Image/Z (IZ) bus 27.

The graphics engine uses for major logic blocks to perform the pixel rendering. They are: (1) request handler, (2) slope calculation, (3) span generation, and (4) pixel interpolation.

Request Handler. The request handler monitors the output of the graphics FIFO 21 for data. When data arrives, the request handler analyzes it and writes it to an appropriate processing block. The request handler routes vertex data for triangles and lines to the slope calculation block. Drawing requests (other than vertex data for triangles and lines) such as blits, fills, and bit expands, bypass the slope calculation and span generation blocks. The request handler routes this data directly to the pixel interpolation block.

Slope Calculation. The slope calculation block performs the slope calculation part of the rendering process for triangles and lines. Floating-point math ensures the accuracy of triangle edges. The slope calculation block calculates color derivatives, depth derivatives, and edge slopes. It also adjusts the vertex data to a pixel center for the topmost vertex. The slope calculation block converts all data to a fixed-point format and routes it to the span generation block.

Span Generation. The span generation block performs the span calculation part of the rendering process for triangles and lines. The span generation block determines the leftmost x and y coordinates for each scan line in a triangle. It also calculates the initial color and depth value for each scanline, and routes the data to the pixel interpolation block.

Pixel Interpolation. The pixel interpolation block is common for all graphics drawing requests. For triangle meshes, the pixel interpolation block expands the data from the span generation block to pixel data by successively adding the x-derivative value to the initial color and depth values (z) for each span. The pixel interpolation block also maps the (x,y) address to a linear address before sending the address and pixel data to either the frame buffer or texture subsystem 250 over the IZ bus. The IZ bus 27 is a 64 bit, 256 MB per second bus with a pixel span protocol to facilitate high data throughput. This protocol allows burst transfers of pixel data to occur between the rendering subsystem and the frame buffer subsystem. The maximum burst size is 4096 pixels.

The graphics engine 22 is thus an ASIC which receives requests from a host processor via the PCI system bus 201. Requests are written to graphics FIFO buffer 21 and are read, decoded and executed by the graphics engine 22. Requests include graphic primitives (points, lines and triangles), rectangular fill, get/put pixel data, blits, and control requests.

These requests are broken down into "span" requests—requests to read or write a horizontal sequence of adjacent pixels. The span requests are written to the IZ bus 27. For requests which require read back data, such as register read or frame buffer read requests, an output FIFO is provided. Both the input and output portions of FIFO 21 are accessible by programmed or DMA transfers. DMA controllers 211 are provided on board.

The graphics engine also supports a second FIFO interface which can connect to a boardset enabling fast JPEG decompression and display to the frame buffer.

Resolvers The four resolver ASICs 331–334 on the graphics processor board control the flow of data to and from the frame buffer memory. These resolvers provide a 256-bit frame buffer interface. This wide interface allows the embodiment to achieve a very high drawing bandwidth. The resolvers thus coordinate the movement of data from the frame buffer memory to the video selector and mapper (VSM) ASIC chips 381–388 and DAC 39 (digital to analog converter) in the display subsystem. The graphics engine ASIC 22 sends interpolated pixel data over the IZ bus 27 to the resolver ASIC's IZ input FIFO. The pixel data consists of color (Red, Green, Blue, and Alpha-RGBA) and depth (Z) data. The resolver IZ input FIFO is 128 words deep, so that the resolver can accommodate bursts of pixel data without slowing overall system performance.

The resolver examines pixel data from the input FIFO and determines if it should write the pixel data to the VRAM (video RAM) on the frame buffer board. The resolver performs Z, mask and alpha tests to determine if data should be written.

The resolver may perform an Arithmetic and Logic Unit (ALU) operation on a combination of the source data (data from the graphics engine) and the destination data (data in VRAM). The operations include logical operations, Porter and Duff style alpha blend operations, and OpenGL style alpha blend operations.

The resolver performs several different types of VRAM write cycles including reads, writes, or read-modify-writes. It maximizes memory bandwidth by choosing an appropriate type. The resolver performs block write cycles to maximize performance for window clear and fill requests.

The resolvers 331–334 are thus a set of identical ASICs that accept span requests over the IZ bus 27 and read from or write to the frame buffer formed by VRAM memory chips 341–314. They also perform the tasks of masking, alpha test, Z buffering, and frame buffer merge (read/modify/write) operations (such as X windows ALU operations and alpha blend operations).

Frame buffer

The basic system contains one frame buffer—virtual screens are not supported—but in a typical embodiment 34 MB of memory is provided by 136 VRAMs, each VRAM having 2 megabits of memory. Each pixel in the frame buffer memory in this embodiment then has 126 bits or planes.

This frame buffer allows window-based double buffering on up to 15 different windows independently in each of the three sets of planes. They are also used to specify RGB to VLT routing for the image planes, and are used to allow roam buffer display in a window. Most writes to the frame buffer are to a single "visual"— i.e. a single set of planes. For example, visual 2 is the image (RGB) set of planes, and visual 1 is the overlay set of planes. Certain "implied" data may be written at the same time a write occurs to some visuals. The implied data comes out of a static register in the graphics engine (via the span header) and consists of the control data which is listed with the visible planes above—for example a write to the image planes can also write the WID2 bits and the image VLT context bits. Implied writes may be independently enabled or disabled via write enables.

Additional information regarding the frame buffer and other details of this graphics processing system may be found in the concurrently filed patent application entitled "Vertex List Management System" by Jeffrey J. Holt, and bearing attorney docket number 1247/115. This concurrently filed application has been incorporated hereinabove by reference. Further details of this graphics processing system and how it may be implemented in the present invention may be found in the GLI Hardware Technical Reference published August 1994 by Intergraph Corporation, Huntsville, Ala. 35894-0001.

Note that different implementations of this architecture may contain a subset of the above planes.

Back end

The back end has a set of VSMs 381–388 (Video Selector and Mapper) which drive RAM DACs 39 (Digital to Analog Converters), and the video timing logic. The VSM ASIC receives pixel data from the frame buffer. It selects which buffer (front or back), and which data (image or overlay), to display. The VSM uses the video selection planes to choose a VLT mapping if it decides to display image planes. The VSM sends the mapping result to the DAC on the processor board. The VSMs thus read the appropriate planes of the frame buffer, perform lookup through one of the 8 VLTs, and send RGB to the RAMDACs.

The DAC converts pixel data from the VSM to an analog voltage and sends it to a monitor 391 for display. The integrated DAC contains a Video Lookup Table (VLT) consisting of 256 locations ×3 colors (RGB) ×10 bits per color used for gamma correction. The DAC also provides a user definable 64×64 pixel hardware cursor.

For each of the three plane sets (highlight, overlay and image) the WID bits associated with those planes are used to index into one of three small lookup tables. A bit in this LUT selects which buffer is to be displayed for that plane set. The LUT associated with the image planes also is used to specify routing between the RGB planes and the VLTs. The overlay VLT context bit is used to select between VLT context 0 and 1. The image VLT context bits can select any of the 8 VLT contexts available. All VLT contexts are capable of being specified as either pseudo color or true color when driven by the image visual.

Bits in the WID tables are also provided to select the roam buffer, and disable display of the overlay and highlight planes.

Roam processor subsystem

The roam subsystem is shown in FIG. 1. (For purposes of simplicity, it is not shown in FIG. 3, but is generally analogous in structure to the frame buffer structure shown in FIG. 3.) This subsystem is effectively an additional frame buffer larger than the actual screen size. This buffer can be roamed in a toroidal fashion within a window in the static frame buffer. The frame buffer has a set of resolvers 161 that are configured as "roamers" connected to the IZ bus 17, the frame buffer 14 as above, and a pixel shifter followed by a set of VSMs (like 381–388) which feed into the digital RGB stream to the RAMDACs 39. Since the VLTs are in the VSMs, the roam buffer has its own set of 8 VLT contexts.

The roam buffer displays through a window defined by the WID bits in the static frame buffer. Each of the WIDs index into their lookup table in the static frame buffer VSMs, and if all three enable the roam buffer, the roam buffer will display. If any do not select roam, roam will not display. This allows static frame buffer pixels to overlay the roam buffer.

Texture processor

The texturing subsystem 250 is an optional subsystem which interfaces solely through the IZ bus 27. The texturing subsystem 250 logically lies between the rendering subsystem and the frame buffer subsystem. The texturing subsystem 250 comprises four texture processor ASICs 251–254 and 32 MB of texture memory 251a, 252a, 253a and 254a. Each texture processor ASIC performs texturing operations for a single band (red, green, blue or alpha) or texture memory.

The texture processors 251–254 receive two types of setup parameters from the graphics engine 22: one type for triangles and one type for pixel spans within a triangle. The triangle setup parameters consist of texturing control information and texture coordinate derivatives, and the pixel span setup parameters consist of initial texture coordinates. These texturing processors 251–254 correct for perspective during texture coordinate interpolation and thereby reduce image distortion.

The texture memory is capable of storing several sets of mip-mapped textures for subsequent texture mapping. In mip-mapping, multiple-sized versions of a texture are stored. Each version is filtered to account for distance from the viewer. The texture processor chooses eight texels nearest the actual texel value from the nearest two mip maps. The texture processor interpolates these eight texels to produce the actual texel value through the use of trilinear interpolation. The actual texel value replaces or blends with the Gouraud shaded pixel value generated by the graphics engine 22. Finally, the texture processors route the textured pixels to the resolvers 331–334 and the resolvers 331–334 write the textured pixels into the frame buffer 341–344.

When the graphics engine 22 receives textured requests (that is, requests which contain texture coordinates), it sends special span requests to the texturing subsystem 250 over the IZ bus 27. The texturing subsystem 250 intercepts these spans, textures the pixels within it, and then resends the span to the resolvers 331–334. Texture memory 251a, 252a, 253a, and 254a looks like frame buffer memory 341–344 to the graphics engine, and is loaded/read back by normal get/put and fill operations.

The Use of Two Video-Controller Subsystems

Figure 4:
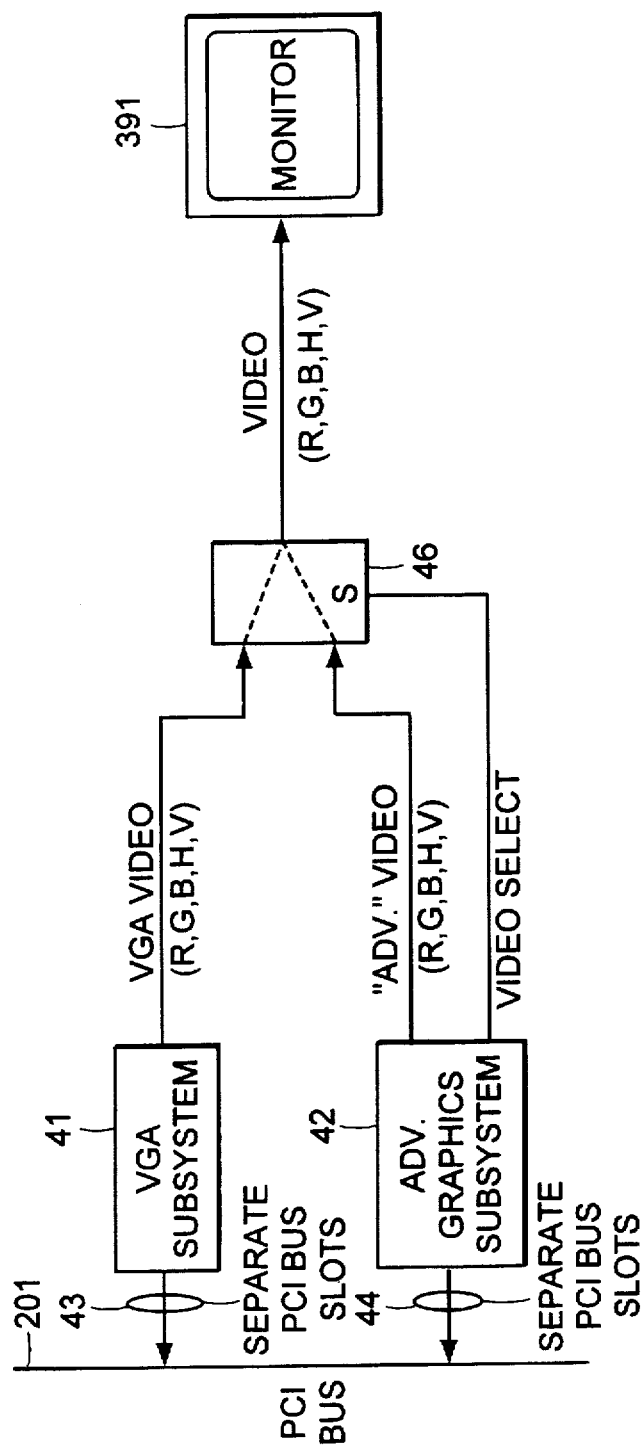
FIG. 4 is a block diagram showing a preferred embodiment of the invention.
Figure 5:
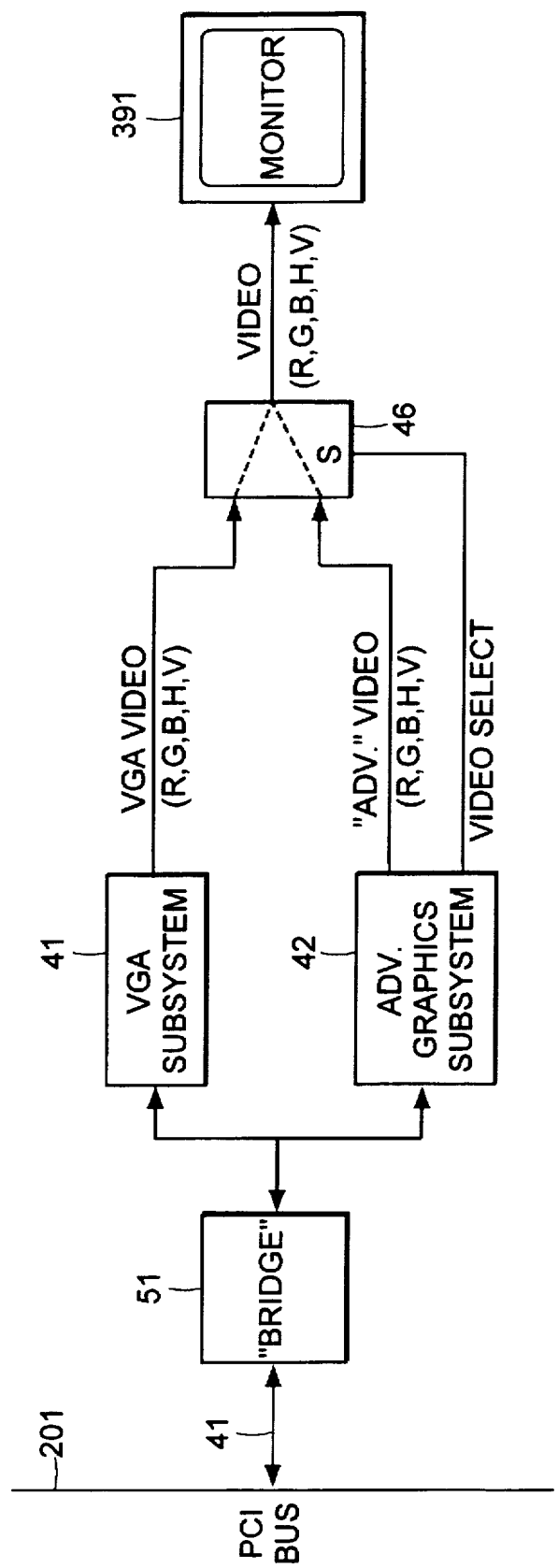
FIG. 5 is a block diagram showing an alternative embodiment of the invention.

FIGS. 4 and 5 show two ways that the above-described advanced graphics processing system may be used in the present invention as a second-video-controller subsystem. A preferred arrangement shown in FIG. 4 uses two slots on the PCI bus. In order to satisfy the BIOS's requirement of a standard-video-controller subsystem, a VGA subsystem 41 is connected to a PCI bus slot 43. An advanced graphics subsystem 42 is attached to a separate PCI bus slot 44.

Figure 6B:
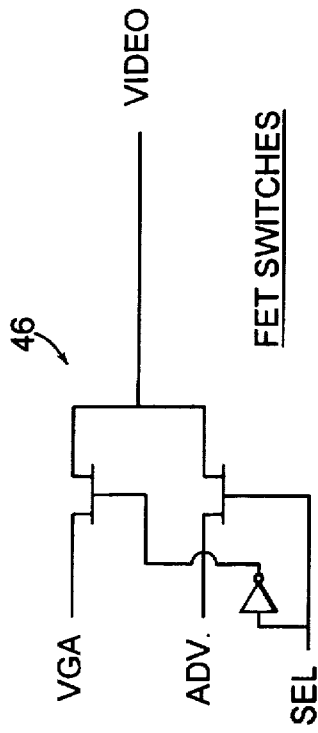
FIGS. 6A–6D show a variety of switch arrangements that may be used in the embodiments shown in FIGS. 4 and 5.
Figure 6D:
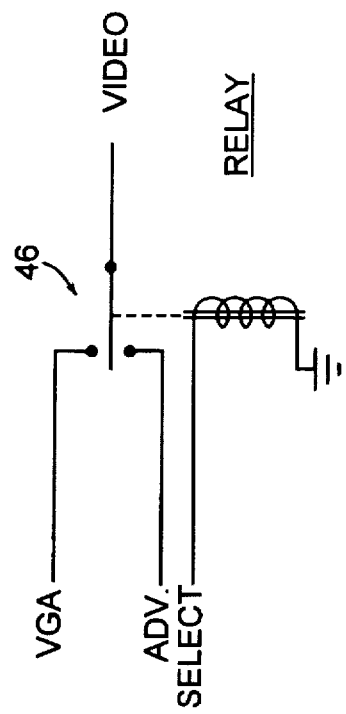
Figure 6A:
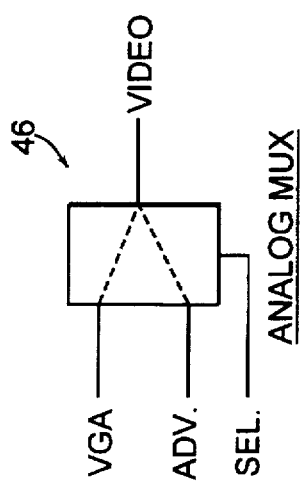
Figure 6C:
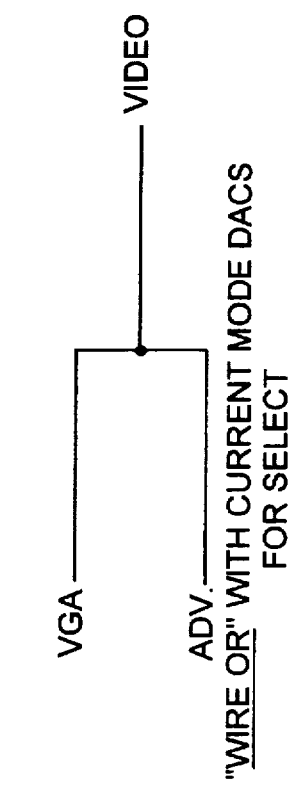

Both of these subsystems are connected to the monitor 391 through a switch 46 that permits either the VGA subsystem 41 or the advanced graphics subsystem 42 to transmit video signals to the monitor 391. The switching function may be accomplished in a number of ways, including without limitation by an analog multiplexer such as that shown in FIG. 6A, by several FET switches such as the arrangement shown in FIG. 6B, by a wired-OR arrangement as shown in FIG. 6C where the selection is performed by current-mode DACs, or by a relay such as that shown in FIG. 6D. Digital means may also be used to affect the switching. The advanced graphics subsystem 42 preferably provides a video select signal to the switch 46 to cause the switch to select either of the two subsystems. This video select signal would normally be triggered after the BIOS boot-up, when the software for the advanced graphics subsystem is loaded and executed and then indicates to the advanced graphics subsystem to take over the video processing function from the VGA subsystem (or other standard-video-controller subsystem). The VGA subsystem is typically only used during the boot process and in full-screen DOS mode. The user can select to display either VGA mode or advanced-graphics mode.

In the alternative arrangement of FIG. 5, the VGA subsystem 41 and the advanced graphics subsystem 42 share the same PCI bus slot 41. A bridge 51 that switches between the VGA subsystem 41 and the advanced graphics subsystem 42 connects these two subsystems to the PCI bus slot 41.

FIGS. 7A–7E show how the components of a video controller according to the present invention and including a VGA subsystem 41 and an advanced graphics subsystem 42 based on the graphics processor and frame buffer systems shown in FIGS. 2 and 3 are arranged on circuit boards. In the arrangement shown in FIGS. 7A–7E, most of the video controller's components are located outside of the host computer's housing. Inside the host computer's housing is the host adapter board 270, which includes a slot connector 71 for attaching to the host computer's PCI bus, a PCI buffer chip (PCIBUF) 202 and other buffer components 74, and a connector 73 for a cable, which is represented in FIG. 2 as connecting the PCIBUF component 202 on the host adapter board 270 to the expansion adapter 203. The cable connects the components of the video controller inside the host computer's housing with video controller components located in a separate housing.

Figure 7A:
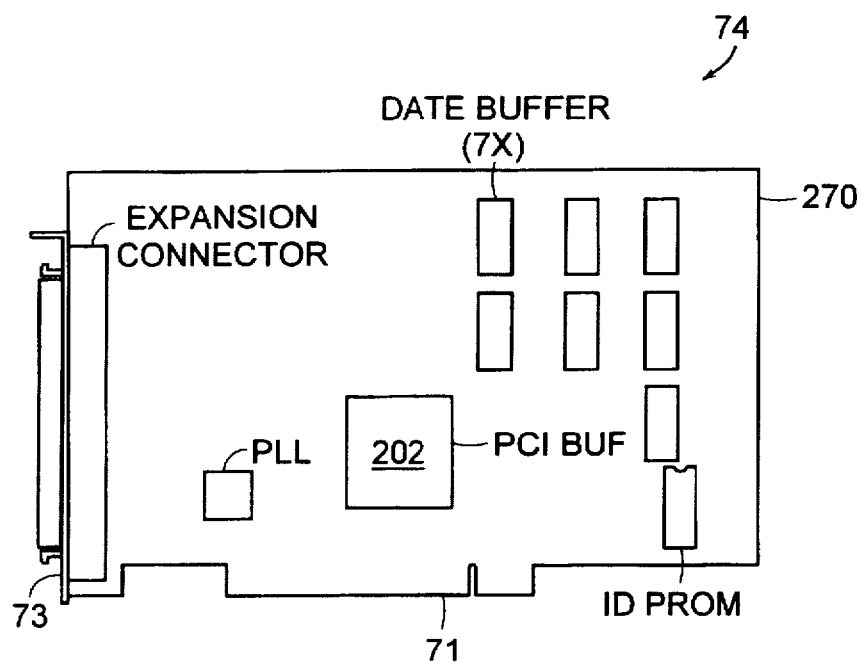
FIGS. 7A–7E show an arrangement of circuit boards for implementing an embodiment of the invention using the graphics processor and frame buffer systems shown in FIGS. 2 and 3.
Figure 7B:
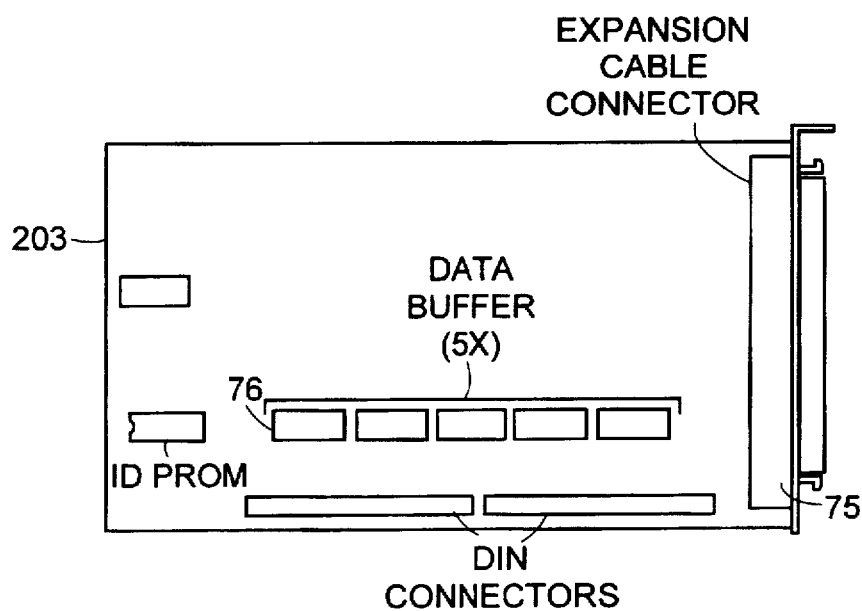
Figure 7C:
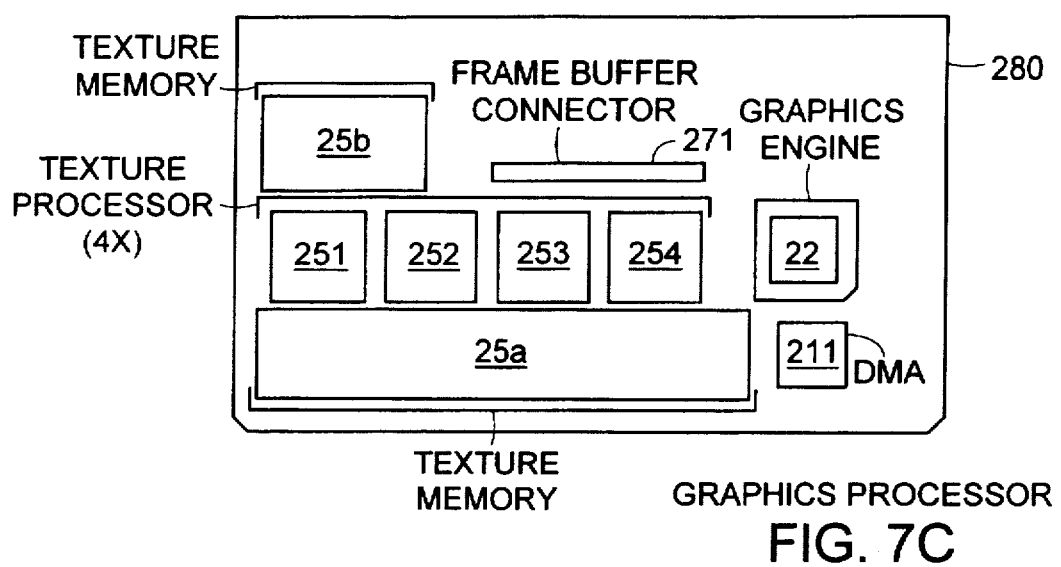
Figure 7D:
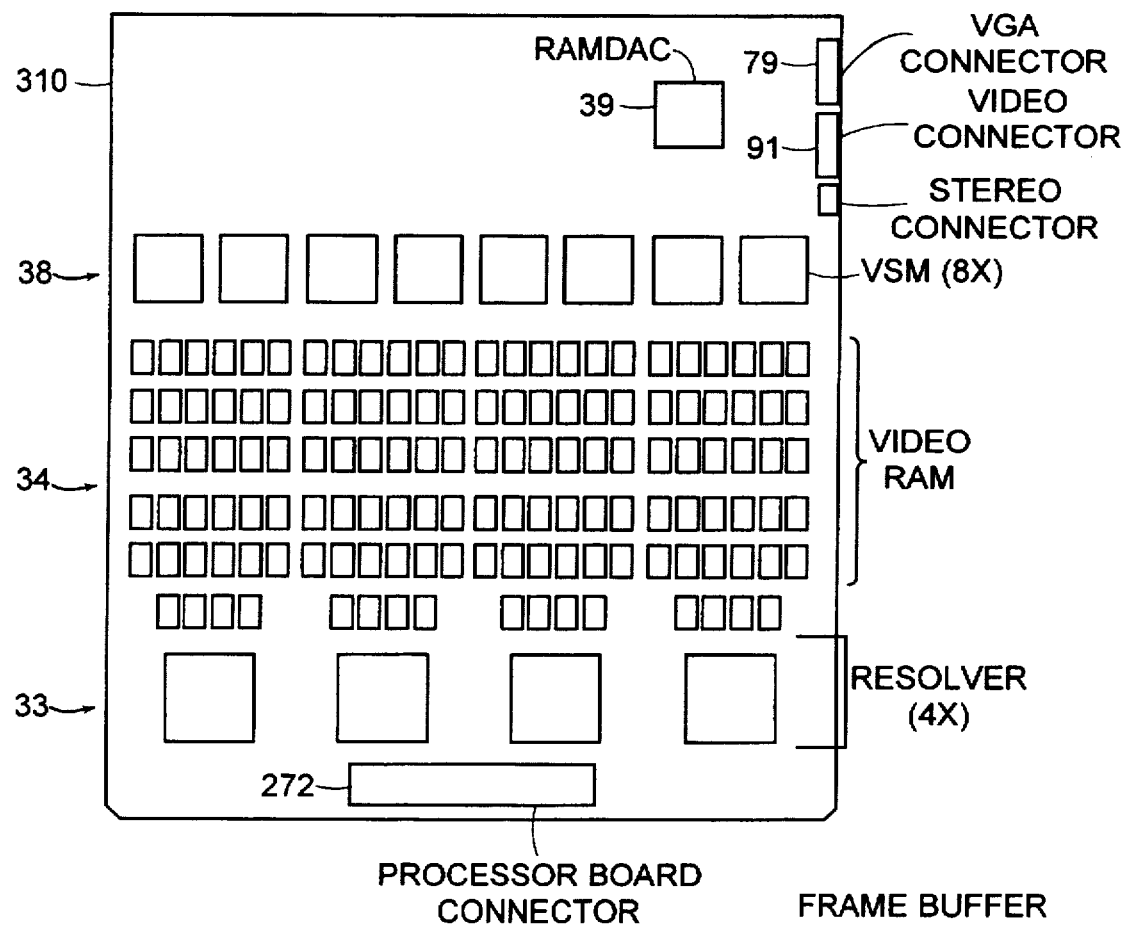

The components in this separate housing are mounted on the circuit boards shown in FIGS. 7B–7D. FIG. 7B shows the expansion adapter board 203, which provides the interface between the host adapter board 270 and the components in the separate housing, and which includes a cable connector 75 for connecting to the other end of the cable attached to the connector 73 of the host adapter board 270. The expansion adapter board 203 receives and buffers the image data from the host adapter board 270, and includes memory chips 76 for use as the data buffer. FIG. 7C shows the graphics processor board 280, which is also represented in the block diagram of FIG. 2. The graphics processor board 280 includes a DMA chip 211, a graphics-engine chip 22, a connector 271 for the IZ bus (item 27 in FIGS. 2 and 3), texture-processor chips 251–254, and texture-memory chips 25a and 25b. FIG. 7D shows the frame buffer board 310, which is represented in the block diagram of FIG. 3. The frame buffer board 310 includes a connector 272 for the IZ bus, resolver chips 33, video RAM chips 34, VSM chips 38 and a RAMDAC chip 39. The frame buffer board 310 also includes a connector 79 for connecting to the VGA board 411, which is mounted in the host computer's housing, and a connector 91 for connecting the monitor.

Figure 7E:
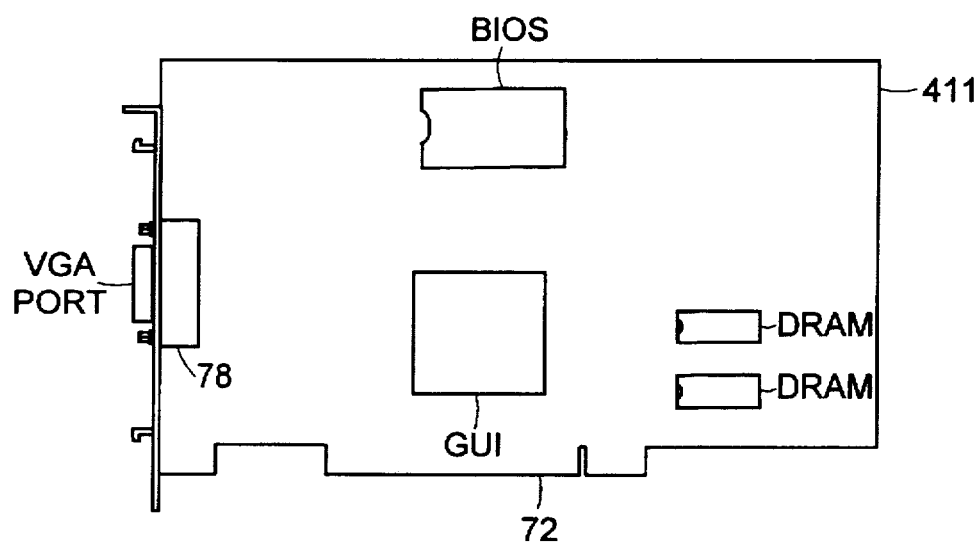

The VGA board 411, which is depicted in FIG. 7E, includes a slot connector 72 for connecting to the PCI bus, and a VGA port 78, which may be connected by means of a cable to the VGA connector 79 on the frame buffer board 310.

Figure 8:
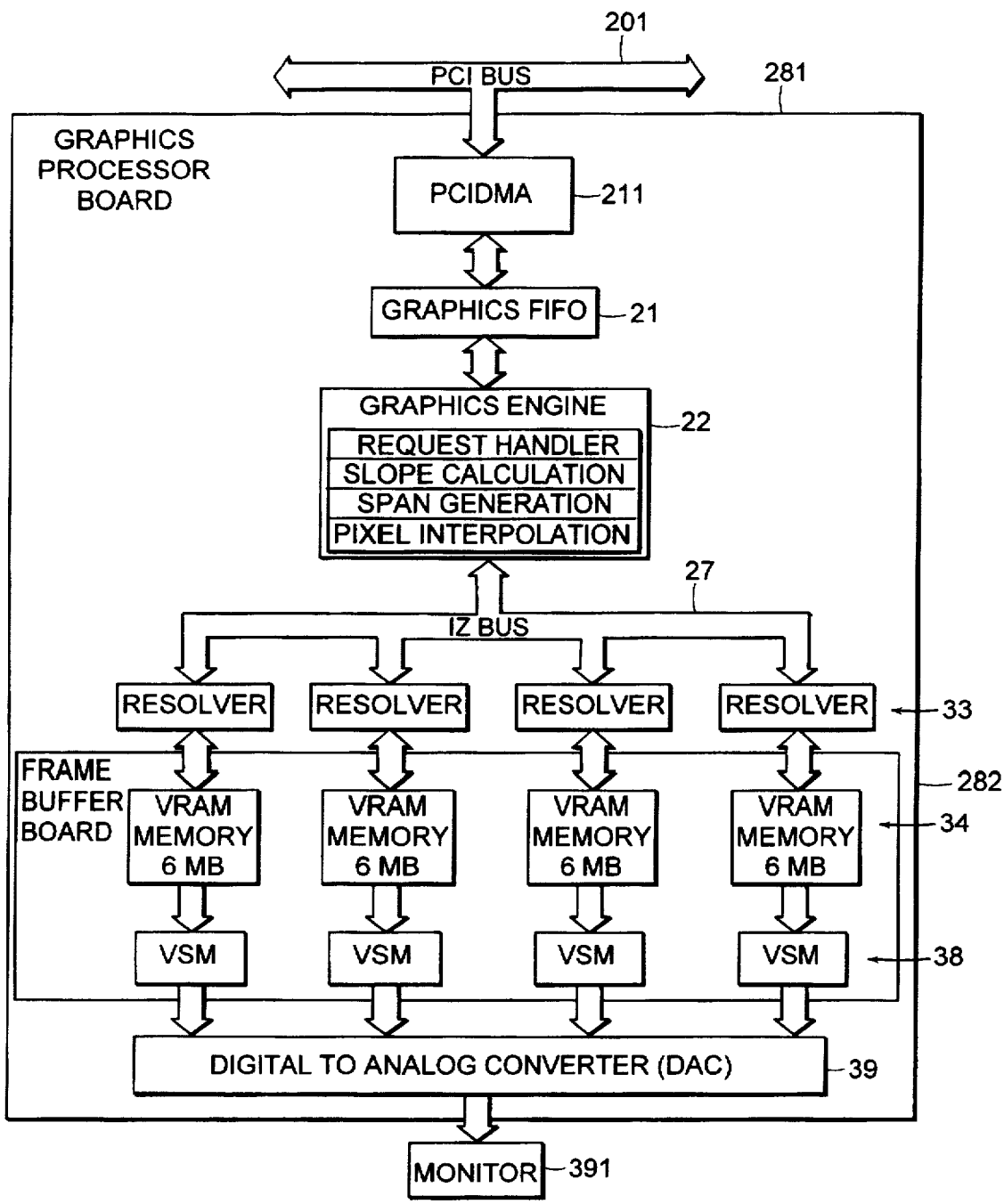
FIG. 8 is a block diagram of an alternative graphics processor system (including the frame buffer system) that may be used in the present invention.

An alternative advanced graphics processing system is depicted as a block diagram in FIG. 8. It will be appreciated that this system has components that are similar in nature to some of the components shown in the system shown in FIGS. 2 and 3. The FIG. 8 system is connected to the PCI bus 201, and includes a PCIDMA 211, a graphics FIFO buffer 21, a graphics engine 22, and IZ bus 27, resolvers 33, video RAM 34, VSMs 38 and a D/A converter 39, which is connected to a monitor 391. Further details of this graphics processing system and how it may be implemented in the present invention may be found in the *GLZ Hardware Technical Reference* published Aug. 1994 by Intergraph Corporation, Huntsville, Ala. 35894-0001.

Figure 9A:
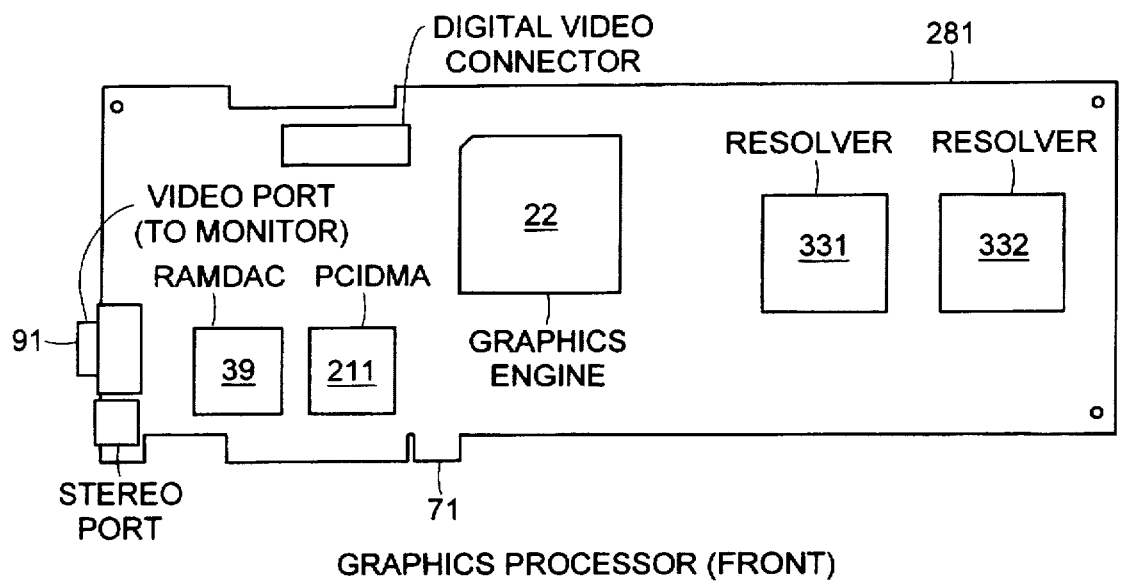
FIGS. 9A–9D show an arrangement of circuit boards for implementing an embodiment of the invention using the graphics processor system shown in FIG. 8.
Figure 9B:
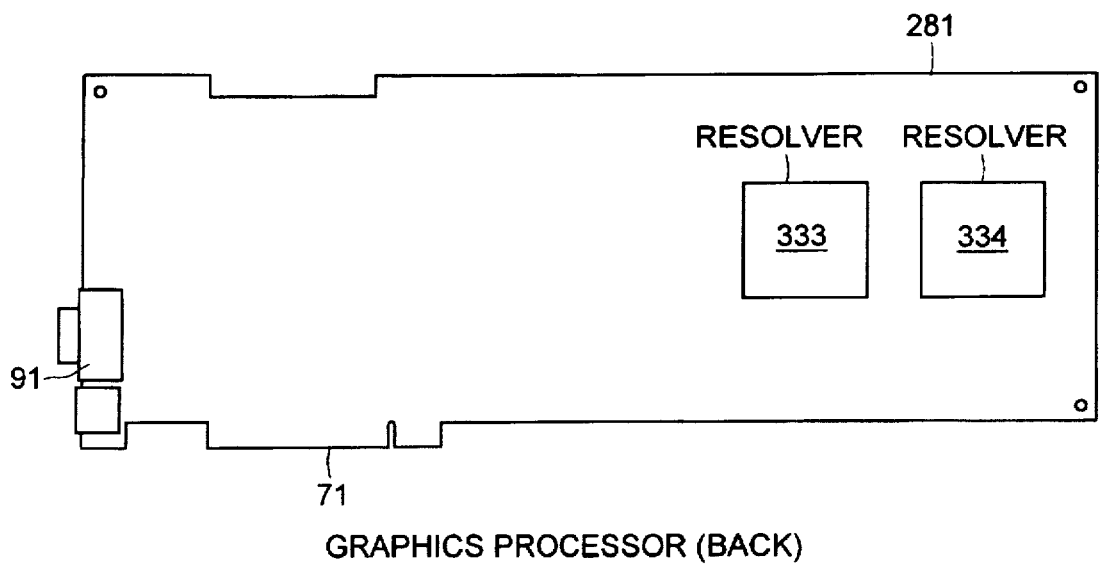
Figure 9C:
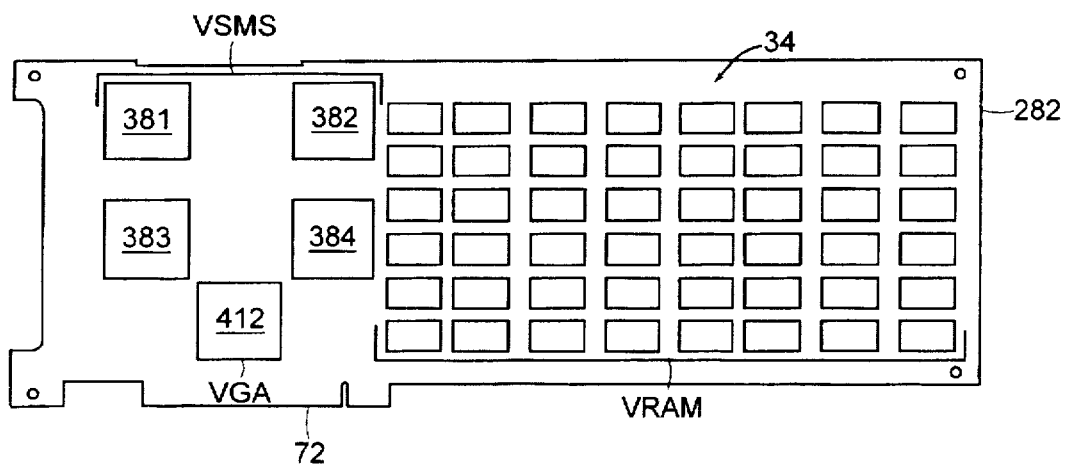
Figure 9D:
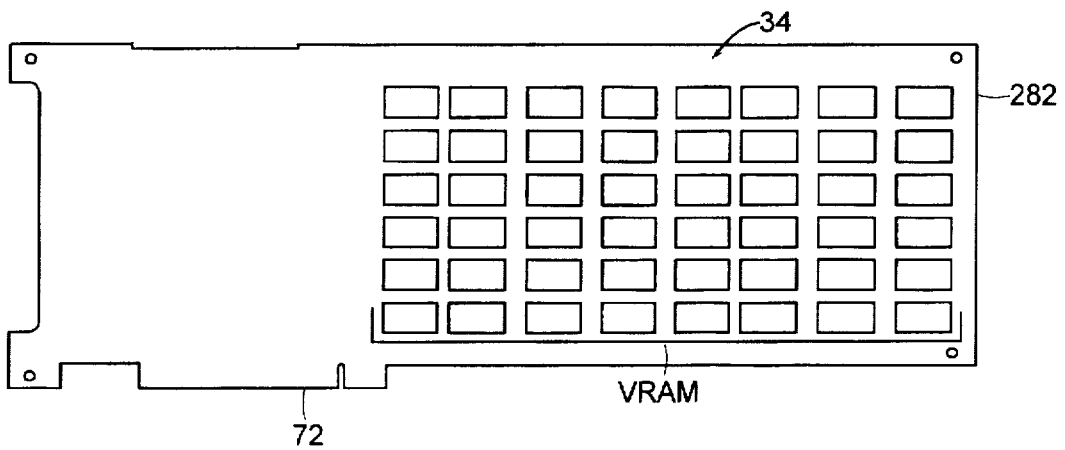

This advanced graphics processing system is preferably used as a subsystem along with a VGA subsystem in personal computer using standard BIOS. The components of such a system, combined from these two subsystems, are preferably mounted on a pair of circuit boards located within the personal computer's housing. FIGS. 9A–9D shows one preferred arrangement of components. FIGS. 9A and 9B depict the front and back sides of the graphics processor board 281, which is represented in the block diagram of FIG. 8 as including all the advanced graphics components except for the video RAM 34 and the VSMs 38. As shown in FIGS. 9A and 9B, the graphics processor board 281 includes a slot connector 71 for connecting to the PCI bus, a PCIDMA chip 211, a graphics-engine chip 22, and resolvers 332. The graphics processor board 281 is electrically connected—such as by means of a ribbon cable—to the frame buffer board 282, the front and back of which is depicted in FIGS. 9C and 9D, and which is also depicted in the block diagram of FIG. 8. The frame buffer board 282 includes video RAM chips 34 and VSM chips 381–384, as shown in FIGS. 9C and 9D. The signals from the VSM chips 381–384 are sent back to the graphics processor board 281, where they are converted into analog signals by the RAMDAC chip 39.

The analog signals then pass to the video port 91, which is connected to the monitor.

The component for the VGA subsystem, a VGA chip 412 (such as the Cirrus 5434 chip) is mounted on the frame buffer board 282. The VGA chip 412 is connected to the PCI bus by means of the slot connector 72 on the frame buffer board 282. The VGA chip is also connected electrically through a switch (item 46 in FIG. 4) to the video port 91 on the graphics processor board 281. Thus, the frame buffer board holds components from both the advanced graphics subsystem (the VSMs and the video RAM) and the standard-video-controller subsystem (the VGA chip), and further provides separate access for the standard-video-controller subsystem to the PCI bus—through the slot connector 72. The advanced graphics subsystem's access to the PCI bus is through the slot connector 71 on the graphics processor board 281, but since this board (the dimensions of which are dictated by the dimensions of the personal computer's housing) cannot fit all of the components for the advanced graphics subsystem, some of the advanced graphics subsystem's components are placed on the board—the frame buffer board 282—containing the component or components of the standard-video-controller subsystem (the VGA chip 412).

Although the graphics processor board 281 and the frame buffer board 282 can be separately installed in the host computer's housing and then electrically connected by means of a ribbon cable or the like, the preferred embodiment of the invention has the two boards rigidly and mechanically fastened to each other, by bolts or the like, with spacers to keep the two boards—and importantly the two slot connectors 71 and 72—spaced apart the correct amount, i.e., the amount that the slots in the host computers bus are spaced apart. Such an arrangement, where the boards are mechanically as well as electrically linked, eases the installation of the video controller system.

Although the invention has been described with reference to several preferred embodiments, it will be understood by one of ordinary skill in the art that various modifications can be made without departing from the spirit and the scope of the invention, as set forth in the claims hereinbelow.

What is claimed is:

1. A high-performance video controller for a microprocessor-based computer having a bus, the bus having a plurality of slots, each slot for receiving a slot connector associated with a device to operate in communication with the computer, wherein (i) the bus is of the type imposing a single-device-per-slot limitation and (ii) the computer has a BIOS requiring on boot-up of the computer the presence of a standard video controller, the high performance video controller comprising: (a) a connector arrangement having at least one slot connector; (b) a standard-video-controller subsystem for providing a first video mode during boot-up, the standard-video-controller subsystem coupled to the connector arrangement and having a first video output; and (c) a second-video-controller subsystem for providing a second video mode after boot-up, the second-video-controller subsystem coupled to the connector arrangement and having a second video output, wherein the controller switches from the first video mode to the second video mode after boot-up.

2. A high-performance video controller according to claim 1, wherein the connector arrangement has a plurality of slot connectors.

3. A high-performance video controller according to claim 2, wherein the slot connectors are rigidly linked to one another.

4. A high-performance video controller according to claim 3, further comprising a plurality of circuit boards and wherein each slot connector is associated with one of the circuit boards and the circuit boards are rigidly linked to one another.

5. A high-performance video controller according to claim 4, wherein collectively the standard-video-controller subsystem and the second-video-controller subsystem have more than two components, and one or more components for the standard-video-controller subsystem are disposed on a first one of the circuit boards and components for the second controller are disposed on a plurality of the circuit boards including the first circuit board.

6. A high-performance video controller according to claim 2, further comprising a plurality of circuit boards and wherein each slot connector is associated with one of the circuit boards.

7. A high-performance video controller according to claim 6, wherein collectively the standard-video-controller subsystem and the second-video-controller subsystem have more than two components, and one or more components for the standard-video-controller subsystem are disposed on a first one of the circuit boards and components for the second controller are disposed on a plurality of the circuit boards including the first circuit board.

8. A high-performance video controller for a workstation-type microprocessor-based computer having a bus, the bus having a plurality of slots, each slot for receiving a slot connector associated with a device to operate in communication with the computer, wherein (i) the bus is of the type imposing a single-device-per-slot limitation and (ii) the computer has a BIOS requiring on boot-up of the computer the presence of a standard video controller, the high performance video controller comprising:

a connector arrangement having at least one slot connector;

a standard-video-controller subsystem coupled to the connector arrangement and having a first video output;

a second-video-controller subsystem coupled to the connector arrangement and having a second video output;

a system video output; and a switch for providing, at the system video output, the first video output during boot-up and for switching to the second video output after boot-up.

9. A high-performance video controller according to claim 8, wherein the switch arrangement is disposed between (i) the video outputs of each of the standard-video-controller subsystem and the second-video-controller subsystem and (ii) the system video output.

10. A high-performance video controller according to claim 9, further including a switching bridge disposed between (i) each of the standard-video-controller subsystem and the second-video-controller subsystem and (ii) the connector arrangement.

11. A high-performance video controller according to claim 9, wherein the connector arrangement has a plurality of slot connectors.

12. A high-performance video controller according to claim 11, wherein the slot connectors are rigidly linked to one another.

13. A high-performance video controller according to claim 12, further comprising a plurality of circuit boards and wherein each slot connector is associated with one of the circuit boards and the circuit boards are rigidly linked to one another.

14. A high-performance video controller according to claim 11, further comprising a plurality of circuit boards and wherein each slot connector is associated with one of the circuit boards.

15. A high-performance video controller according to claim 14, wherein collectively the standard-video-controller subsystem and the second-video-controller subsystem have more than two components, and one or more components for the standard-video-controller subsystem are disposed on a first one of the circuit boards and components for the second controller are disposed on a plurality of the circuit boards including the first circuit board.

16. A method of providing and using a high-performance video controller in a microprocessor-based computer having a monitor and a bus, the bus having a plurality of slots, each slot for receiving a slot connector associated with a device to operate in communication with the computer, wherein (i) the bus is of the type imposing a single-device-per-slot limitation and (ii) the computer has a BIOS requiring on boot-up of the computer the presence of a standard video controller, the method comprising the steps of:

providing a connector arrangement having at least one slot connector;

inserting the slot connector into a slot of the computer;

providing a standard-video-controller subsystem coupled to the connector arrangement, such that the computer recognizes the presence of the standard-video-controller subsystem on the bus during boot-up, the standard-video-controller subsystem having a video output;

providing a second-video-controller subsystem coupled to the connector arrangement, such that the computer is able to provide image information and instructions to the second-video-controller after boot-up, the second-video-controller having a video output;

providing a switching arrangement to allow transmission to the monitor of the video output of either the standard-video-controller subsystem or the second-video-controller subsystem;

setting the switching arrangement during boot-up to allow transmissions of the video output of the standard-video-controller subsystem to the monitor; and activating the switching arrangement after boot-up to allow transmission of the video output of the second-video-controller subsystem to the monitor.

17. A workstation-type computer for providing high-performance video output, the computer comprising:

a bus having a plurality of slots, each slot capable of receiving a slot connector associated with a device to operate in communication with the computer, wherein the bus is of the type imposing a single-device-per-slot limitation;

a BIOS requiring on boot-up of the computer the presence of a standard video controller;

a connector arrangement having at least one slot connector and being attached to at least one slot;

a monitor;

a standard-video-controller subsystem for providing a first video mode during boot-up, the standard-video-controller subsystem coupled to the connector arrangement and having a first video output to the monitor; and a second-video-controller subsystem for providing a second video mode after boot-up, the second-video-controller subsystem coupled to the connector arrangement and having a second video output to the monitor, wherein the controller switches from the first video mode to the second video mode after boot-up.

18. A method of providing a high-performance video output, in a microprocessor-based computer, the method comprising:

(a) providing the computer system having
  i. a BIOS which requires, at boot-up, the presence of a first video controller,
  ii. a bus having a plurality of slots, each slot for receiving a slot connector associated with a device to operate in communication with the computer, the bus being of the type imposing a single-device-per-slot limitation, and
  iii. a monitor;

(b) providing in a first slot a first-video-controller subsystem having a standard video format for output to the monitor;

(c) providing in a second slot a second-video-controller subsystem having a second video format for output to the monitor;

(d) providing a switch for selecting between the first-video-control-subsystem and the second-video-control-subsystem, the selected controller having means for outputting video data to the monitor, wherein at boot-up the switching means automatically defaults to selecting the first video controller; and (e) activating the switch after boot-up to select the second video controller, so as to allow the transmission of the second video controller's video data to the monitor.

* * * * *